United States Patent [19]

Koyama et al.

[11] Patent Number: 5,093,070
[45] Date of Patent: Mar. 3, 1992

[54] CORE LOADING STRATEGY

[75] Inventors: Junichi Koyama, Hitachi; Motoo Aoyama, Mito; Akinobu Nakajima, Hitachi; Hiromi Maruyama, Katsuta, all of Japan

[73] Assignee: Hitachi, Ltd., Tokyo, Japan

[21] Appl. No.: 448,209

[22] Filed: Dec. 8, 1989

[30] Foreign Application Priority Data

Dec. 12, 1988 [JP] Japan .................. 63-312025

[51] Int. Cl.$^5$ .................................... G21C 19/02
[52] U.S. Cl. ...................... 376/267; 376/349; 376/419; 376/428; 376/435
[58] Field of Search ............. 376/267, 349, 419, 428, 376/435

[56] References Cited

U.S. PATENT DOCUMENTS

| | | | |
|---|---|---|---|
| 2,892,765 | 6/1959 | Young | 376/349 |
| 3,799,839 | 3/1974 | Fischer et al. | 376/419 |
| 3,986,924 | 10/1976 | Motoda | 376/267 |
| 4,229,258 | 10/1980 | Takeda et al. | 376/419 |
| 4,280,874 | 7/1981 | Kawai et al. | 376/419 |
| 4,378,329 | 3/1983 | Uchikawa et al. | 376/435 |
| 4,451,427 | 5/1984 | Ross et al. | 376/267 |
| 4,587,090 | 5/1986 | Mochida et al. | 376/428 |
| 4,851,181 | 7/1989 | Takeda et al. | 376/267 |

FOREIGN PATENT DOCUMENTS 57-70489 of 0000 Japan .
62-217186 of 0000 Japan .
53-57388 5/1978 Japan .

OTHER PUBLICATIONS

Chen et al., "Optimal Power Profile Fuel Management", Annals Of Nuclear Energy, vol. 4, 1977, pp. 407–415.

Primary Examiner—Stephen C. Bentley
Attorney, Agent, or Firm—Antonelli, Terry Stout & Kraus

[57] ABSTRACT

A core of boiling water reactor is divided into a central region and a peripheral region surrounding it in the radial direction thereof. The loading fraction of new first fuel assemblies containing burnable poison and loaded in the central region is greater than the loading fraction of the new first fuel assemblies loaded in the peripheral region. The loading fraction of second fuel assemblies loaded in the central region of the core and operating in a second operation cycle is smaller than the loading fraction of the second fuel assemblies loaded in the peripheral region of the core and operating in the second operation cycle. The second fuel assemblies contain no burnable poison. In such a core, the reactivity of the peripheral region is greater than that of the central region in the beginning of an operation cycle. Contrary, the reactivity of the central region is greater than that of the peripheral region in the end of an operation cycle.

12 Claims, 15 Drawing Sheets

| UPPER END | NATURAL URANIUM |
| --- | --- |
| UPPER PORTION | HIGH ENRICHMENT |
| LOWER PORTION | LOW ENRICHMENT |
| LOWER END | NATURAL URANIUM |

(AVERAGE 3.85 W/O)

| UPPER END | NO GADOLINIA |
| --- | --- |
| UPPER PORTION | MEDIUM CONCENTRATION x16 |
| LOWER PORTION | HIGH CONCENTRATION x10<br>LOW CONCENTRATION x4 |
| LOWER END | NO GADOLINIA |

FIG. 9
PRIOR ART

|   |   |   |   |   |   |   |   | 4 | 3 | 4 | 3 | 4 | 4 | 3 |
|---|---|---|---|---|---|---|---|---|---|---|---|---|---|---|
|   |   |   |   |   |   |   | 4 | 3 | 2 | 1 | 2 | 1 | 3 | 2 |
|   |   |   |   |   |   | 4 | 4 | 4 | 2 | 1 | 3 | 1 | 3 | 1 | 3 |
|   |   |   |   |   |   | 4 | 1 | 2 | 3 | 2 | 1 | 2 | 3 | 2 | 3 |
|   |   |   |   |   | 4 | 3 | 2 | 1 | 2 | 1 | 2 | 3 | 2 | 3 | 1 |
|   |   |   | 4 | 4 | 4 | 2 | 1 | 3 | 1 | 3 | 1 | 2 | 1 | 2 | 3 |
|   |   |   | 4 | 1 | 2 | 3 | 3 | 3 | 2 | 1 | 2 | 1 | 2 | 1 | 3 |
|   |   | 4 | 3 | 2 | 1 | 2 | 1 | 2 | 3 | 2 | 3 | 3 | 1 | 3 | 3 |
|   | 4 | 4 | 2 | 3 | 2 | 1 | 2 | 3 | 2 | 1 | 2 | 1 | 2 | 1 | 3 |
|   | 3 | 2 | 1 | 2 | 1 | 3 | 1 | 2 | 1 | 3 | 1 | 2 | 1 | 3 | 1 |
|   | 4 | 1 | 3 | 1 | 2 | 1 | 2 | 3 | 2 | 1 | 3 | 3 | 2 | 1 | 3 |
|   | 3 | 2 | 1 | 2 | 3 | 2 | 1 | 3 | 1 | 2 | 3 | 3 | 3 | 2 | 3 |
|   | 4 | 1 | 2 | 1 | 2 | 1 | 2 | 1 | 2 | 3 | 2 | 1 | 2 | 3 | 1 |
|   | 3 | 2 | 1 | 3 | 1 | 3 | 1 | 3 | 1 | 2 | 1 | 3 | 1 | 2 | 3 |
|   | 4 | 1 | 2 | 1 | 2 | 1 | 3 | 3 | 2 | 1 | 2 | 1 | 2 | 1 | 3 |

CORE LOADING STRATEGY

BACKGROUND OF THE INVENTION

The present invention relates to a core loading strategy, and particularly to a core loading strategy which are suitable for use in a boiling water reactor.

In each light-water type power reactor, e.g., in each boiling water reactor, many fuel assemblies form a lattice in the core, and control rods are vertically moved among the fuel assemblies. The reactor of such type operates in accordance with the excess reactivity of core which is determined by operating the control rods and by the burnable poisons (for example, gadolinia) contained in the fuel assemblies. When the excess reactivity becomes zero, spent fuel assemblies are discharged from the core and the core is charged with new fuel assemblies so that fuel exchange is performed. The arrangement of the fuel assemblies in the core is changed as occasion demands.

In order to increase the core reactivity for improving the economical efficiency of fuel it is preferable that the fuel assemblies having a high degree of reactivity are arranged at the center of the core having a high level of neutron importance. However, in such arrangement, since the output power generated at the radially center of the core is extremely high, the safety margins of fuel rods are reduced. In order to solve these conflicting problems, several methods have been proposed for adjusting the power distribution in the radial direction without producing any loss in reactivity.

Examples of methods for flattening the power distribution in the radial direction of a core include the methods disclosed in U.S. Pat. No. 3,986,924 and Japanese Patent Laid-Open (KOKAI) 53-57388. In these methods, the distribution of infinite multiplication factors in the radial direction of a core is changed by adjusting the amount of uranium-235 in the radial direction of the core. That is, the amount of uranium-235 at the center of the core is smaller than that of uranium-235 in the peripheral portion of the core which surrounds the center thereof so that the infinite multiplication factor at the center of the core is lower than that in the peripheral portion thereof.

There is a method which employs burnable poison for flattening the power distributions in the radial direction and axial direction of the core. This method is disclosed in U.S. Pat. No. 3,799,839. In the radial direction of the core disclosed in U.S. Pat. No. 3,799,839, the amount of burnable poison at the center of the core is greater than the amount of burnable poison at the peripheral portion thereof, and in the axial direction of the core the amount of burnable poison at the center of the core is greater than the amounts of burnable poison at the upper end and lower end portions of the core. In the core disclosed in Japanese Patent Laid-Open (KOKAI) 53-70489, fuel assemblies, each containing a large amount of burnable poison, are disposed at the center of the core, and the other fuel assemblies, each containing a small amount of burnable poison, are disposed in the peripheral portion of the core. In the radial direction of this core, the amount of burnable poison at the cener of the core is greater than the amount of burnable poison at the peripheral portion thereof.

In the core disclosed by U.S. Pat. No. 3,799,839, the concentration of burnable poison of the fuel assemblies disposed at the center of the core is greater than that of the fuel assemblies disposed in the peripheral portion of the core, and the number of the fuel assemblies containing burnable poison and arranged at the center of the core is greater than that of the fuel assemblies containing burnable poison and arranged at the peripheral portion of the core. Japanese Patent Laid-Open No. 57-70489 discloses the concentration of burnable poison and number of fuel assemblies containing burnable poison similarly to U.S. Pat. No. 3,799,839. Japanese Patent Laid-Open No. 57-70489 also discloses an example of a core in which the number of the fuel assemblies containing burnable poison and arranged at the center of the core is equal to that of the fuel assemblies containing burnable poison and arranged at the peripheral portion of the core. Japanese Patent Laid-Open No. 57-70489 discloses that the above-mentioned core can improve the efficiency of fuel utilization without any loss in the shutdown margin. The core disclosed in Japanese Patent Laid-Open No. 57-70489 also can flatten the power distribution in the radial direction of core similarly to the core disclosed in U.S. Pat. No. 3,799,839.

SUMMARY OF THE INVENTION

It is a first object of the present invention to provide a core loading strategy in which a maximum linear heat generation rate is limited within an allowable range and which improve the efficiency of fuel utilizataion.

It is a second object of the present invention to provide a reactor core which improves significantly the efficiency of fuel utilization by utilizing the margin of maximum linear heat generation rate in the end of an operation cycle.

It is a third object of the present invention to provide a reactor core which reduces the amount of neutrons absorbed by burnable poison and flattens the power distribution in the radial direction of the core.

The first characteristic of the present invention is that in a core, the average infinite multiplication factor in the peripheral region of the core is greater than that in the central region surrounded by the peripheral region in the beginning of an operation cycle, and the average infinite multiplication factor in the central region is greater than that in the peripheral region in the end of the operation cycle.

The second characteristic of the present invention is that each of new fuel assemblies is divided into an upper region and a lower region in the axial direction thereof and the average enrichment of the upper region is greater than that of the lower region and the amount of burnable poison contained in the upper region is greater than that contained in the lower region.

The third characteristic of the present invention is that in a central region, a plurality of first cells each containing new fuel assemblies and a plurality of second cells are arranged, and an average infinite multiplication factor of second cells is smaller than that of first cells and in each of the second cells a control rod for controlling the power distribution is inserted.

According to the first characteristic of the present invention, the infinite multiplication factors of the radially both sides of the core are changed reversely between the beginning and the end of operation cycle so that the reactivity distribution in the radial direction of core is changed reversely between the beginning and the end of the operation cycle. Therefore, the spectral shift effect is increased in the central region of the core and the efficiency of fuel utilization is improved. In particular, since the reactivity in the central region of the core is improved in the end of operation cycle, the spectral shift effect in the central region is significant. However, the maximum linear heat generation rate is limited within a permissible range.

According to the second characteristic of the present invention, each of the new fuel assemblies arranged in the central region is divided into an upper region and a lower region in the axial direction thereof, and the average enrichment of the upper region is greater than that of the lower region and the amount of burnable poison contained in the upper region is greater than the amount contained in the lower region so that the above-described change in the reactivity distribution in the radial direction and the change in the reactivity distribution in the axial direction are provided, thereby further increasing the spectral shift effect. Further, since the amount of burnable poison in the upper region is large, the margin of maximum linear heat generation rate is increased in the latter half of the operation cycle, as compared with the former half of the operation cycle, and the reactivity can be increased by utilizing the margin to the maximum.

According to the third characteristic of the present invention, since a plurality of second cells are disposed in the central region, an average infinite multiplication factor of the second cells is smaller than that of the first cells and the control rods for controlling the power distriution are inserted in the second cells, the power distribution in the radial direction of core is flattened during the operation of reactor. Thus, the amount of burnable poison is reduced and the amount of neutrons absorbed by the burnable poison is also reduced, whereby production of new fessionable substances is accelerated.

BRIEF DESCRIPTION OF THE DRAWINGS

FIG. 9 is a ¼ cross sectional view of a conventional reactor core;

DETAILED DESCRIPTION OF THE PREFERRED EMBODIMENTS

In each of the above-described conventional cores, the power distribution in the radial direction of core is kept substantially constant during an operational cycle. The operational cycle is formed by a period from the start-up operation of reactor started after the core has been charged with fuel assemblies to the shutdown of reactor for charging the core with new fuel assemblies.

Figure 1:
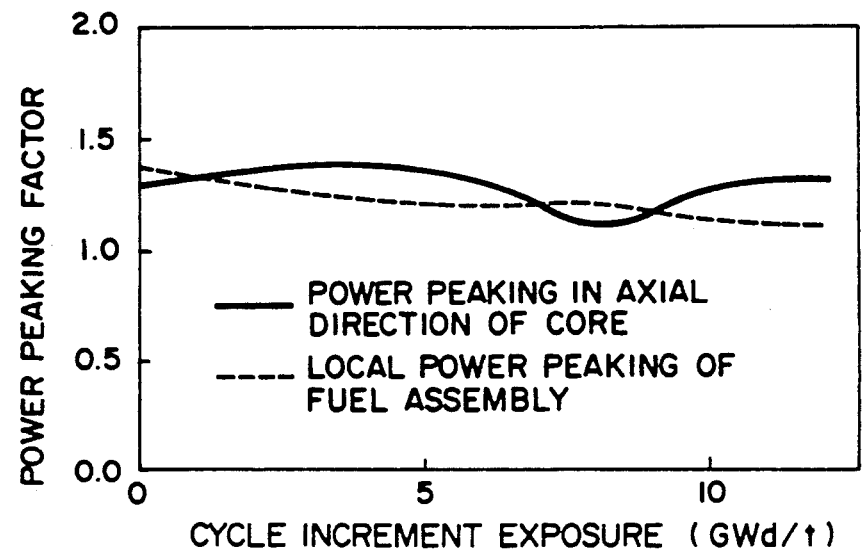
FIG. 1 is a characteristic diagram which shows a relation between a change in power peaking of a core and the exposure.
Figure 2:
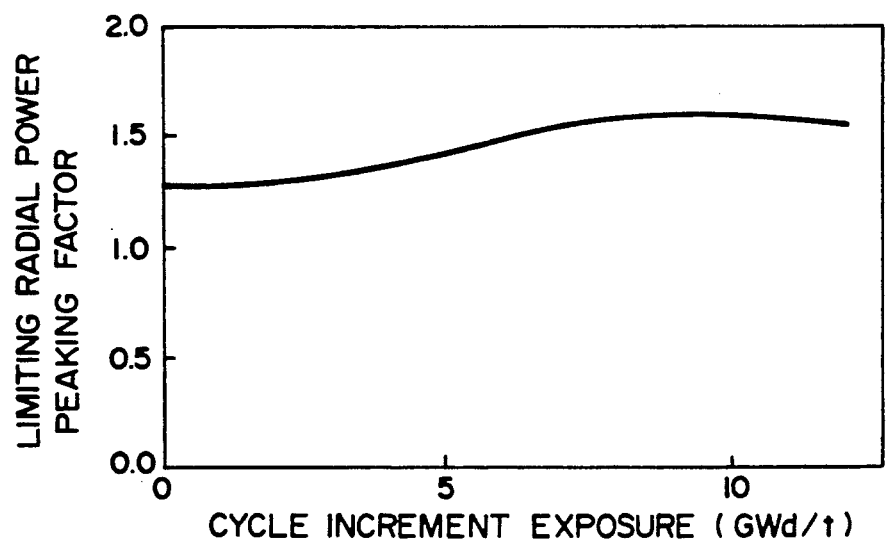
FIG. 2 is a characteristic diagram which shows a relation between a change in limiting radial power peaking factor of a core and the exposure.

The present inventors investigated the characteristics of the prior art, particularly of U.S. Pat. No. 3,799,839 and of Japanese Patent Laid-Open No. 57-70489. As a result, it was found that the maximum linear heat generation rate which significantly affects the safety margin of fuel is determined by the power distribution in the radial direction of core and by the combination of the power distribution in the axial direction of the core and the local power distribution in fuel assemblies. FIG. 1 shows the power peaking factor during one operation cycle. As shown in FIG. 1, the local power peaking factor in fuel assemblies and the power distribution in the axial direction of the core change in accordance with the passage of time in an operational cycle. Thus, the limiting radial power peaking factor which is necessary to satisfy the limit of maximum linear heat generation rate also changes with the passage of time during an operational cycle, as shown in FIG. 2. Namely, the limit of power peaking in the radial direction of core is low in the beginning of operation cycle and becomes high in the end thereof. In view of these characteristics, the present inventors found a new fact that the value of power peaking in the radial direction of core must be kept small in the beginning of the operation cycle, while a relatively large value of power peaking in the radial direction of the core is permissible in the end of the operation cycle. The present inventors also found a new problem that, since the power peaking in the radial direction of core changes in accordance with the progress of burn-up of fuel, the conventional cores in which it is presumed that the power peaking in the radial direction of core is constant can not attain a preferred efficiency of fuel utilization. In other words, the technical problem of the present invention is an improvement in efficiency of fuel utilization.

Figure 3A:
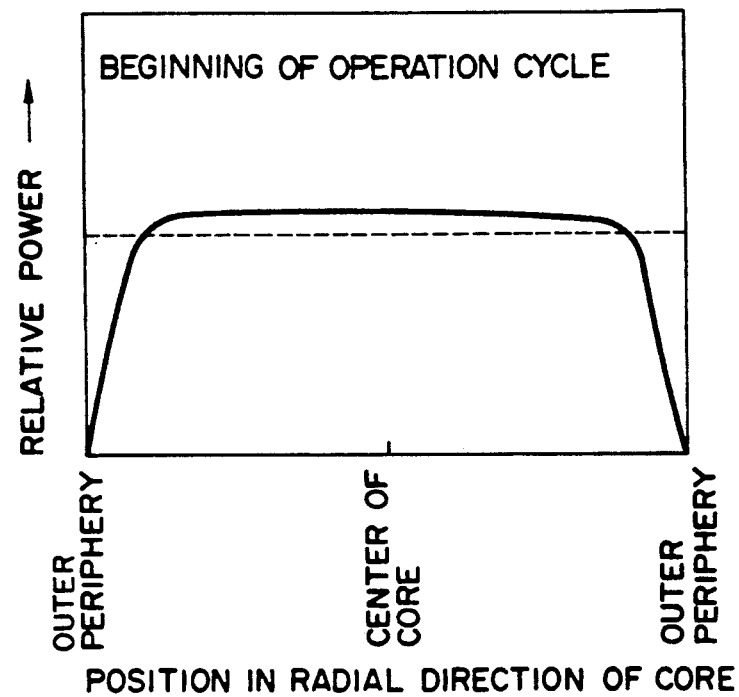
FIGS. 3A and 3B are characteristic diagrams which respectively show the relative power distributions in the radial direction of the core in the beginning and end of operation cycle.
Figure 3B:
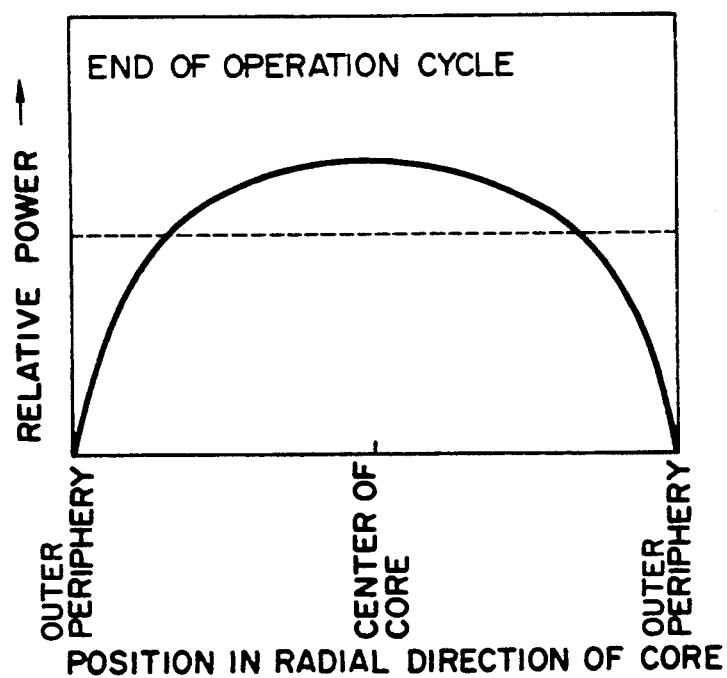

On the basis of the above investigation that the power peaking in the radial direction of core must be limited to a small value in the beginning of the operation cycle and a relatively large value of power peaking in the radial direction of the core is permissible in the end of the operation cycle, according to the present invention, as shown in FIGS. 3A and 3B, in the beginning of an operation cycle, the power distribution in the radial direction of the core is sufficiently flattened or the power in the central region is lowered and in the end of the operation cycle, the power in the central region having a high level of neutron importance is increased and the power peaking in the radial direction of the core is increased, so that the efficiency of fuel utilization is improved. Such an increase in power peaking in the radial direction of core in the end of the operation cycle causes an increase in reactivity of the core.

Figure 4A:
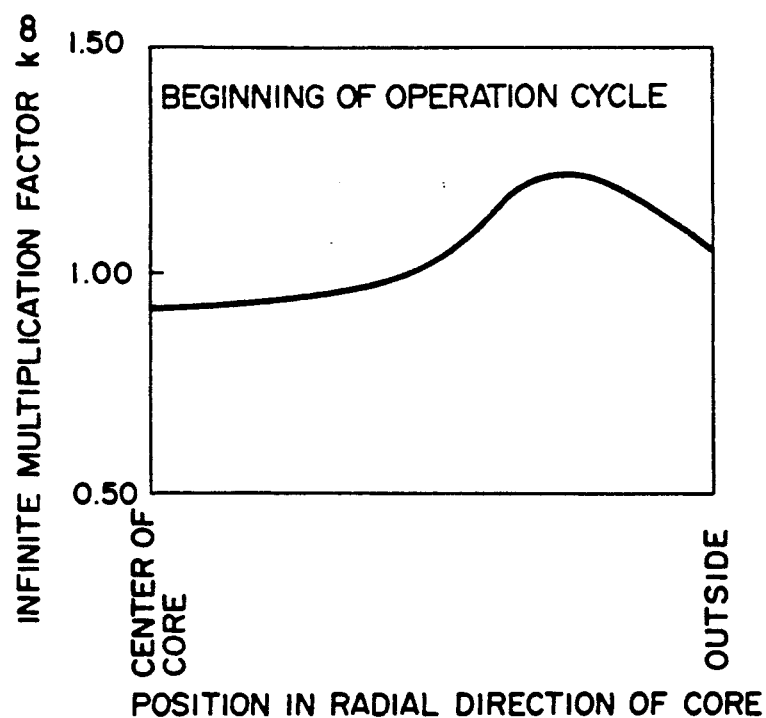
FIGS. 4A and 4B are characteristic diagrams which respectively show the infinite multiplication factors in the radial direction of the core in the beginning and end of operation cycle.
Figure 4B:
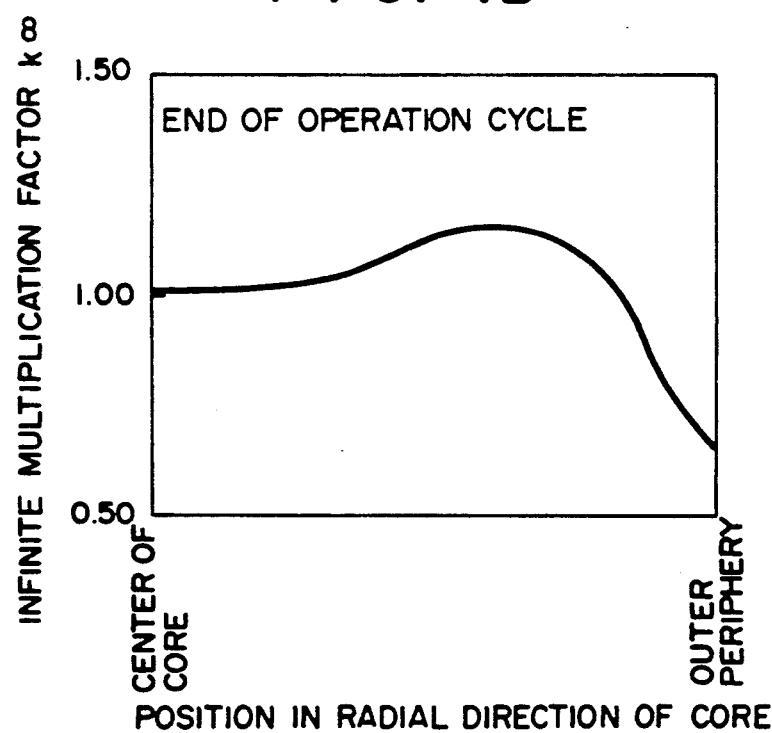

In order to realize the change from the power distribution in the radial direction of the core of FIG. 3A to that of FIG. 3B in an operation cycle, as shown in FIGS. 4A and 4B, the reactivity of the central region of the core in the beginning of an operation cycle must be made smaller than that of the peripheral region surrounding the central region, and the reactivity of the central region of the core in the end of the operation cycle must be made greater in comparison with the beginning of the operation cycle. The reactivity of the peripheral region of the core in the end of the operation cycle is lower in comparison with the beginning of the operation cycle. In this way, since the distributions of reactivity in the radial direction of the core in the beginning and end of the operational cycle are different from each other, the central region of the core operates to increase the so-called spectral shift effect. In the central region, since the power is low in the beginning of the operation cycle, the margin for maximum permissible linear heat generation rate is increased so that the power generated at the lower portion of central region can be increased. Thus, the start point of coolant-boiling is shifted to the coolant inlet side of fuel assemblies so that a region with a high void fraction is enlarged in the axial direction. That is, the void fraction in the central region can be increased in the beginning of the operation cycle. Contrary, in the end of the operation cycle, the power generated at the lower portion of central region must be decreased because of a high level of power generated in the central region. The boiling start point is therefore shifted upward, and the void fraction in the central region is decreased. The change in void fraction causes a change in neutron spectrum. In the beginning of the operation cycle, the neutron spectrum in the central region is hard, and the amount of plutonium produced by excess neutrons is increased in the central region. In the end of the operation cycle, since the neutron spectrum in the central region becomes soft, the reactivity in the central region becomes high. The change in reactivity distribution in the radial direction of the core enables the above-described spectral shift operation and causes an improvement in efficiency of fuel utilization in the core.

Figure 5:
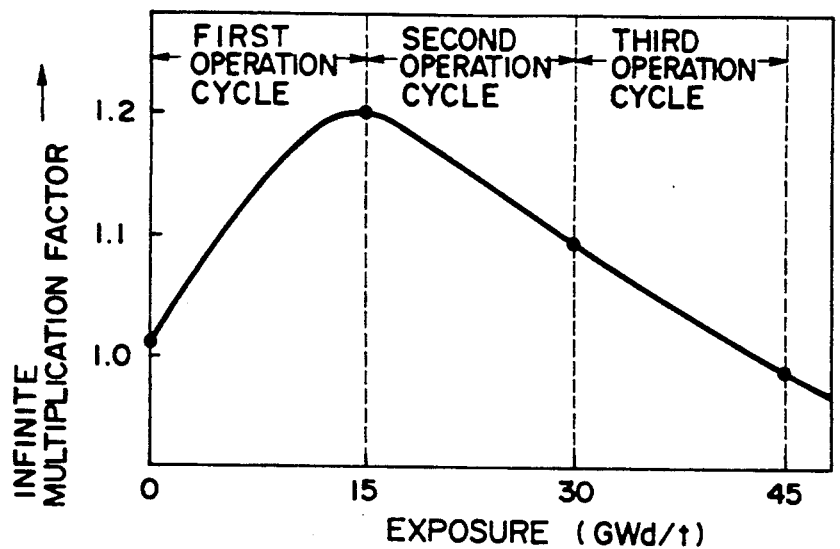
FIG. 5 is a characteristic diagram which shows a relation between the exposure and the infinite multiplication factor in fuel assemblies containing gadolinia.

It was found that the change in reactivity distribution in the radial direction of the core shown in FIGS. 4A and 4B can be obtained by a change in reactivity of the fuel assemblies which were loaded in the core and subjected to a first operation cycle so that the fuel assemblies have the maximum reactivity, and by a change in reactivity of new fuel assemblies containing burnable poison. In particular, it is described below that the infinite multiplication factor of the fuel assemblies containing burnable poison changes in accordance with the progress of burn-up. FIG. 5 shows a relation between the infinite multiplication factor and the exposure of new fuel assemblies containing burnable poison. The relation of FIG. 5 is measured when about ¼ of the fuel assemblies in the core are replaced by new fuel assemblies containing burnable poison in each operation cycle. The burnable poison is used for keeping a substantially constant degree of excess reactivity. Thus, according to the number of fuel rods containing burnable poison in fuel assemblies and according to the concentration of burnable poison thereof a decrease in reactivity of the fuel assemblies remaining in the core is compensated in and after the second operation cycle by the new fuel assemblies whose reactivity increases in accordance with the passage of time in the operation cycles. In the example shown in FIG. 5, the infinite multiplication factor of new fuel assemblies in the beginning of first operation cycle is smaller than that of the fuel assemblies in the beginning of third operation cycle and the infinite multiplication factor of fuel assemblies becomes maximum at the end of the first operation cycle.

On the basis of the results obtained by the above-described consideration, a core structure is improved for achieving spectral shift with a change in reactivity in the radial direction of core. In this core structure, the average infinite multiplication factor in the peripheral region of core is greater than the average infinite multiplication factor in the central region, in the beginning of an operation cycle, and the average infinite multiplication factor in the central region is greater than the average infinite multiplication factor in the peripheral region, in the end of the operation cycle.

Figure 6:
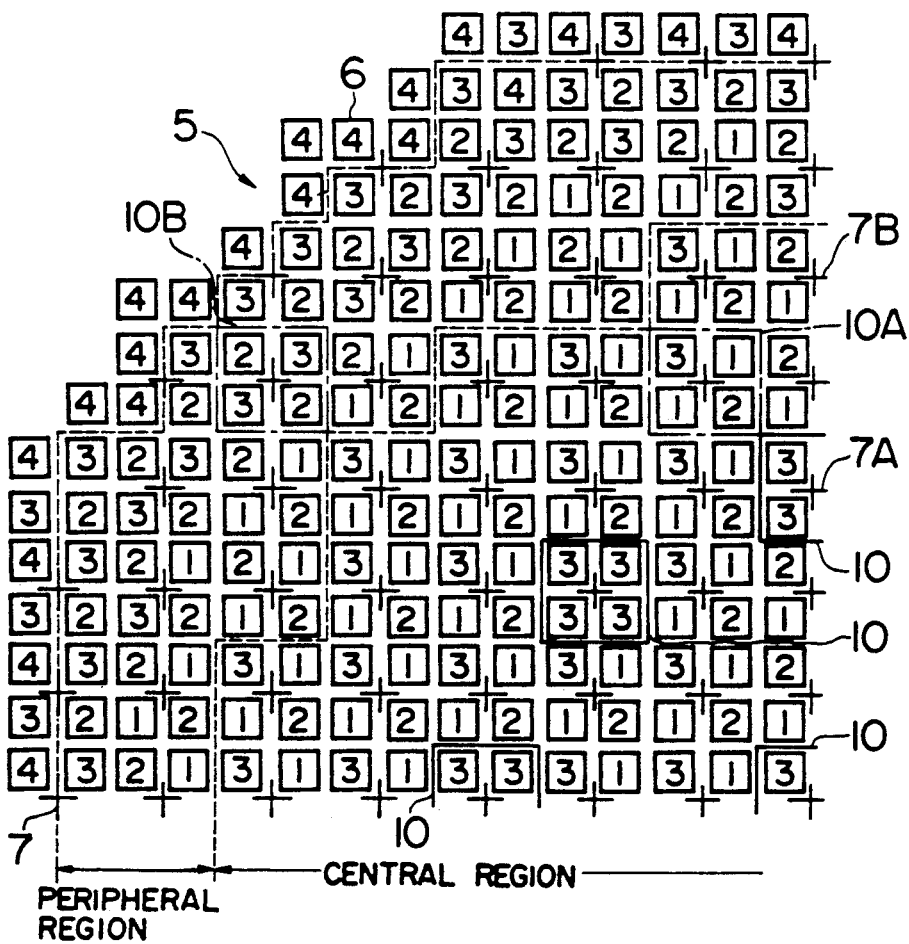
FIG. 6 is a ¼ cross-sectional view showing a preferred embodiment of a boiling water type reactor core according to the present invention.

FIG. 6 shows a preferred embodiment of core structure according to the present invention which is applied to a boiling water type reactor. FIG. 6 shows a cross section of one-quarter part of core 5.

In the core 5, 764 fuel assemblies 6 form a lattice, and control rods 7 can be inserted among the fuel assemblies 6. The core 5 has a central region and a peripheral region excepting a region (outermost peripheral region) of fuel assemblies disposed in the outer most periphery. The peripheral region surrounds the central region. The boundaries between the central region and the peripheral region and between the peripheral region and the outermost peripheral region are indicated by broken lines in FIG. 6. In this embodiment, 356 fuel assemblies 6 are mounted in the central region, and 308 assemblies 6 are mounted in the peripheral region. Fuel assemblies 6 include fuel assemblies 1 to 4. The fuel assemblies 1 are loaded in the core 5 as new fuel assemblies before the first operation cycle. The fuel assemblies 2 to 4 are replaced by new ones between the first and second operation cycles, between the second and third operation cycles and between the third and fourth operation cycles, respectively.

Figures 7, 8A, 8B:
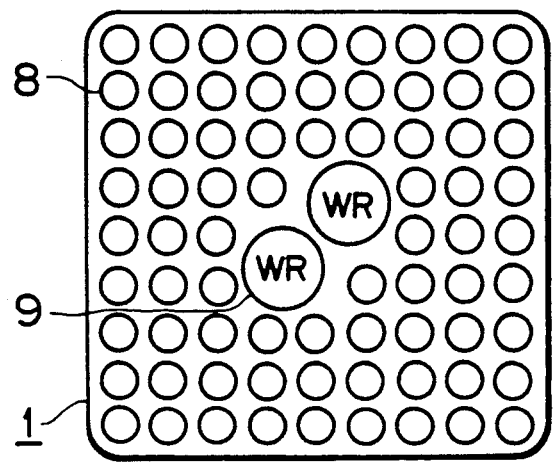
FIG. 7 is a cross sectional view of each of the fuel assemblies shown in FIG. 6.
FIGS. 8A and 8B are schematic views showing the enrichment and gadolinia distribution in the axial direction in each of the fuel assemblies shown in FIG. 7.

Each of the fuel assemblies 1 has the cross-sectional form shown in FIG. 7. This cross-sectional form is shown in FIG. 7 of Japanese Patent Laid-Open No. 62-217186. That is, each of the fuel assemblies 1 has 74 fuel rods 8 which form a lattice comprising 9 lines and 9 columns, and two water rods disposed at the central portion. Each of the fuel rods 8 has many fuel pellets therein, and the external diameter of each of the water rods 9 is greater than the pitch between the fuel rods 8. In each of the fuel assemblies 1, the two water rods 9 occupy a region in which 7 fuel rods 8 can be arranged, as shown in the embodiment shown in FIG. 1 of Japanese Patent Laid-Open No. 62-217186 (specifically, refer to 1 to 6 lines of the upper left column on page 3 of Japanese Patent Laid-Open No. 62-217186).

Each of the fuel rods 8 has the enrichment distribution in the axial direction, as shown in FIG. 8A. Fuel pellets of natural uranium are arranged in the upper end portion and lower end portion of a fuel effective length portion (the region of each fuel rod 8 charged with fuel pellets). The natural uranium regions occupy 1/24 (or 2/24) of the total axial length of fuel effective length portion. Fuel pellets of enriched uranium fill a part of fuel effective length portion other than the natural uranium region. The enriched uranium region is divided into an upper region and a lower region in the axial direction. The boundary between the upper region and the lower region is at a height of 11/24 of the total axial length of fuel effective length portion from the lower end thereof. Since the enrichment of upper region is higher than that of lower region, the average enrichment of upper region of each fuel assembly 1 is higher than that of the lower region thereof. The average enrichment of each fuel assembly 1 is about 3.85% by weight. The 16 fuel rods 8 included by the 74 fuel rods contain gadolinia serving as burnable poison. FIG. 8B shows the gadolinia distribution in the axial direction of each of the fuel rods 8. Each of two gadolinia-containing fuel rods 8 contains a medium concentration of gadolinia in the upper region having a high enrichment and does not contain gadolinia in the other regions. Each of the remaining 14 gadolinia-containing fuel rods 8 contains gadolinia in the enriched uranium region and does not contain gadolinia in the natural uranium region. Each of these 14 gadolinia-containing fuel rods 8 contains a medium concentration of gadolinia in the upper region in the same way as the two before-mentioned gadolinia-containing fuel rods 8. Each of the 10 gadolinia-containing fuel rods 8 of the 14 gadolinia-containing fuel rods contains a high concentration of gadolinia in the lower portion having a low enrichment. Each of the 4 remaining gadolinia-containing fuel rods 8 of the 14 gadolinia-containing fuel rods contains a low concentration of gadolinia in the lower region. The gadolinia contained in each fuel assembly 1 is completely burnt up in the end thereof.

New ones of the fuel assemblies 1 having the above-described arrangement have the exposure of 0 MWd/T. In each of the fuel assemblies 1, the average enrichment of the upper region is higher than that of the lower region, and the amount of gadolinia of the upper region is greater than that of the lower region. The number of the gadolinia-containing fuel rods 8 of the upper region is greater than that of the lower region. In each of the new fuel assemblies 1, the infinite multiplication factor of the upper region is smaller than that of the lower region. To such fuel assemblies 1 is applied the concept of the enrichment distribution and gadolinia distribution which are used in the fuel assembly shown in FIGS. 3A and 3B of U.S. Pat. No. 4,587,090. Each of the fuel assemblies 1 thus has the function of spectral shift shown in line 21 of column 4 to line 17 of column 5 and FIGS. 5, 6, 7, 8 and 9 of U.S. Pat. No. 4,587,090. In each of the fuel assemblies 1, the infinite multiplication factor of the upper region is smaller than that of the lower region in the beginning of the operation cycle, and the infinite multiplication factor of the upper region becomes geater than that of the lower region in the end of the operation cycle. This phenomenon is caused by the possession of the above-described enrichment and gadolinia distributions.

Each of the fuel assemblies 2, 3 and 4 which operated in the reactor during at least one operation cycle contains no gadolinia and has the structure shown in FIG. 7. When the fuel assemblies 2, 3 and 4 were new fuel assemblies, each of them also had the same enrichment and gadolinia distributions as those of the fuel assemblies 1.

When the control rods 7 are inserted into the core 5, one cell is formed by the four fuel assemblies 6 adjacent to each of the control rods 7. The core 5 comprises a plurality of such cells. One of the cells is a control cell 10. The control cell 10 has four fuel assemblies 3 which have been already burnt up in two operation cycles and which have small infinite multiplication factors. The control rod 7A inserted into the control cell 10 is inserted into the core 5 not only during the shut-down of reactor but also during the operation thereof. The control rod 7A is a control rod for controlling the power distribution during the operation thereof. The 9 control cells 10 are arranged in the central region of the core 5. The control rod 7B inserted into each of the cells other than the control cells 10 is a control rod for shutting down the reactor, which control rod is completely withdrawn from the core 5 during the operation of reactor and is inserted into the core during the shut-down of reactor.

Each of cells other than the control cells 10 in the central region of the core 5 contains four fuel assemblies comprising two fuel assemblies 1, one fuel assembly 2 and one fuel assembly 3. The two fuel assemblies 1 are disposed in the diagonal direction of one cell with one control rod 7B arranged therebetween. The fuel assemblies 2 and 3 are disposed in the other diagonal direction with one control rod 7B arranged therebetween.

In the peripheral region of the core 5, each of a small number of the cells contains three types of fuel assemblies (the assemblies 1 to 3), as the cells in the central region, and each of most of the cells contains two types of fuel assemblies. That is, each of some cells contains two fuel assemblies 1 and two fuel assemblies 2, and each of the other cells contains two fuel assemblies 2 and two fuel assemblies 3. In each of these cells, the numbers of operation cycles during which the fuel assemblies disposed diagonally have operated are equal to each other. In the peripheral region, each of the cells containing the fuels assemblies 1, 2 and 3 also contains two fuel assemblies 2, and the fuel assemblies 1 are disposed in a part of peripheral region near the central region. Contrary, the fuel assemblies 3 are disposed in a part of peripheral region near the outermost region. In the outermost peripheral region, the fuel assemblies 3 and 4 are disposed.

In the core 5 of this embodiment, a distance between the boundary between the central region and peripheral region and the center of the core 5 is about 7/10 of the radius of the core.

The central region of the core 5 has 356 fuel assemblies 6 including 160 fuel assemblies 1 which are new fuel and contain gadolinia. The peripheral region of the core 5 has the 308 fuel assemblies 6 including the 68 fuel assemblies 1 described above. The proportion of the fuel assemblies 1 to the fuel assemblies 6 in the central region is greater in comparison with the peripheral region. Namely, in the core 5, a number of the fuel assemblies 1 included by each cell 10B arranged in the peripheral region is smaller than that of the fuel assemblies 1 included by each cell 10A arranged in the central region. Each of the cells arranged in the peripheral region contain at most two fuel assemblies 1. The average number of operation cycles during which the fuel assemblies other than the fuel assemblies 1 operate in the core is 2.50 in the central region and 2.45 in the peripheral region. The central region thus has a greater value. With respect to the fuel assemblies 2 which have the maximum infinite multiplication factor in the beginning of the operation cycle, the proportion of the fuel assemblies 2 to the fuel assemblies 6 in the peripheral region is greater in comparison with the central region. The number of the fuel assemblies 2 included by cells in the peripheral region is greater in comparison with the central region.

The characteristics of the core 5 of this embodiment are described below in comparison with the core 11 shown in FIG. 9. In the core 11, the fuel assemblies 1, 2 and 3 which have operated during respective numbers of operation cycles different from each other are substantially uniformly loaded.

Figure 10A:
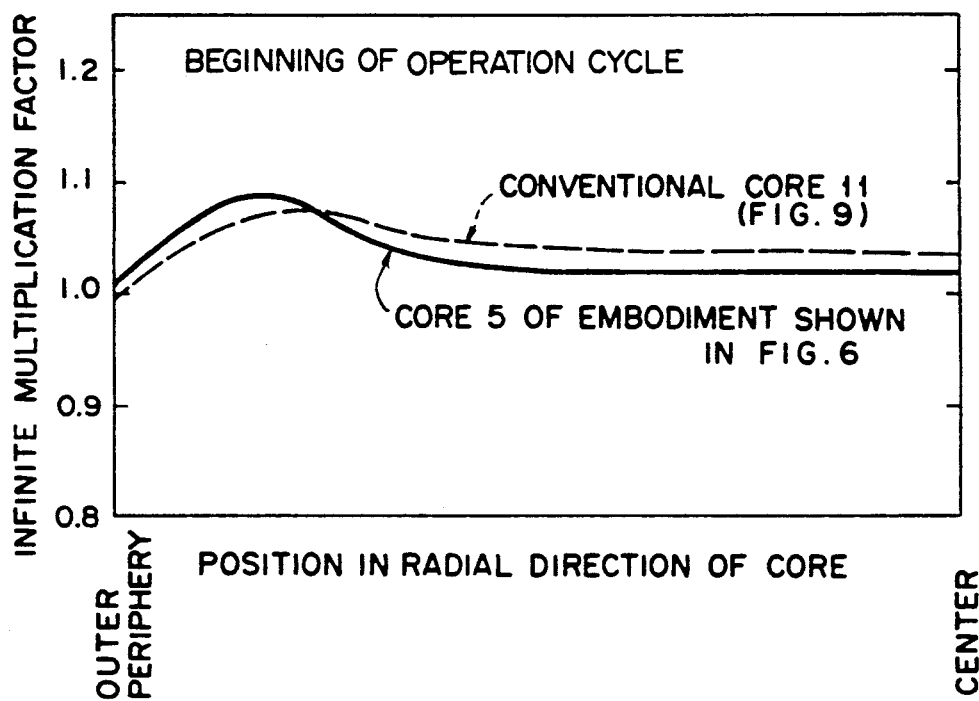
FIGS. 10A and 10B are characteristic diagrams each of which shows a relation between a position in the radial direction of a core and the infinite multiplication factor in the beginning and end of an operation cycle.
Figure 10B:
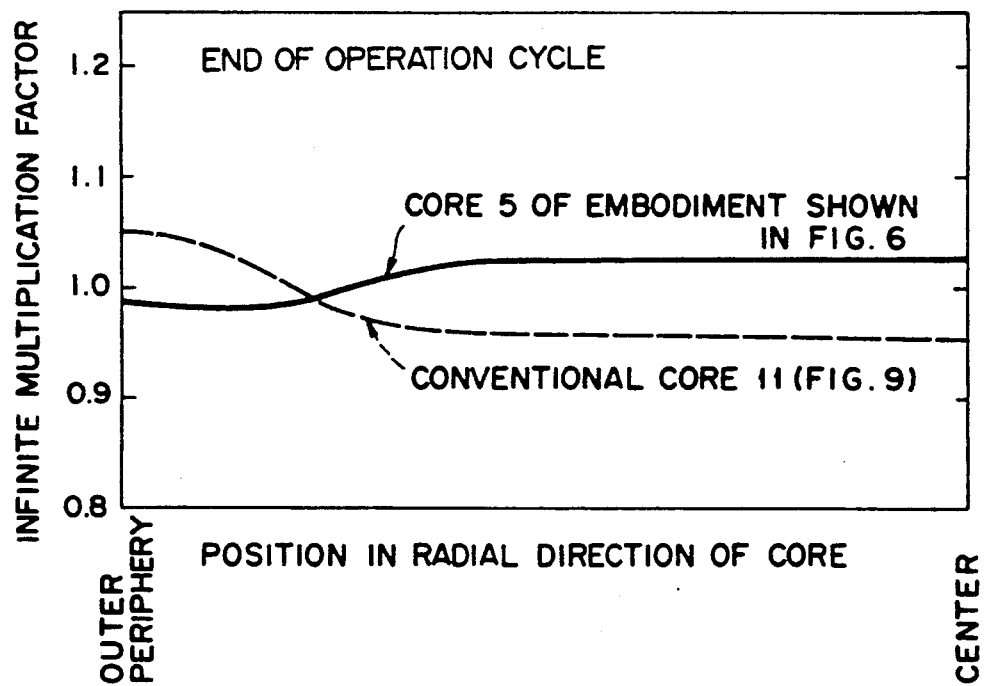

The characteristics of the core 5 and those of the core 11 which are measured when the core 5 and the core 11 are operated according to the same control rod pattern strategy are compared with each other. FIG. 10A shows the smooth distributions of infinite mulitplication factors of the fuel assemblies 6 in the radial direction of the core in the beginning of the operation cycle. FIG. 10B corresponds to FIG. 10A and shows the state in the end of the operation cycle. Since the core 5 contains burnable poison and a loading fraction of the fuel assemblies 1 having small infinite multiplication factors and loaded in the central region is greater than a loading fraction of fuel assemblies 1 loaded in the peripheral region, the average infinite multiplication factor in the central region is smaller in comparison with the peripheral region in the beginning of the operation cycle. In particular, in this embodiment, since the loading fraction of the fuel assemblies 2 having the maximum infinite multiplication factor in the beginning of the operation cycle is great in the peripheral region, the average infinite multiplication factor in the peripheral region in the beginning of operation cycle is increased more than the average infinite multiplication factor obtained when the loading fraction of the fuel assemblies 1 in the peripheral region is small. That is, an increase in loading fraction of the fuel assemblies 2 in the peripheral region causes an increase in difference between the average infinite multiplication factors in the peripheral region and the average infinite multiplication factors in the central region in the beginning of the operation cycle. In the beginning of the operation cycle, the difference in average infinite multiplication factor between the peripheral region and central region of the core 5 is greater than that of the core 11. In the end of the operation cycle, since the gadolinia contained by the fuel assemblies 1 burns out so that the infinite multiplication factor of the fuel assemblies 1 becomes the maximum, the average infinite multiplication factor of the central region of the core 5 becomes greater than that of the peripheral region. The core of this embodiment, in which the central region has a greater loading fraction of the fuel assemblies 1 which contain burnable poison and which have small infinite multiplication factors in comparison with the peripheral region, and in which the peripheral region has a greater loading fraction of the fuel assemblies 2 in comparison with the central region, is a core in which the average infinite multiplication factor of the peripheral region is greater than that of the central region in the beginning of the operation cycle, and in which the average infinite multiplication factor of the central region is greater than that of the peripheral region in the end of the operation cycle (refer to FIGS. 10A and 10B). In the core 11, the average infinite multiplication factor of the central region is greater than that of the peripheral region in both the beginning and end of the operation cycle.

As shown in FIGS. 10A and 10B, since in the distribution of infinite multiplication factors in the radial direction of the core the average infinite multiplication factor of the peripheral region is high in the beginning of the operation cycle, and that of the central region is high in the end of the operation cycle, the spectral shift effect in the central region can be increased, as compared with the effect in U.S. Pat. No. 4,587,090. Thus, the exposure of the core is further increased, thereby further improving the efficiency of fuel utilization. It is a matter of course that the above-described increase in loading fraction of the fuel assemblies 2 in the peripheral region causes a further increase in exposure. The lower the exposure of the fuel assemblies is, the greater the change in reactivity caused by the change in void fraction is. Since the spectral shift is effected mainly in the central region in which a large number of the new fuel assemblies 1 are arranged, therefore, a remarkable improvement of efficiency of fuel utilization is achieved.

Figure 11A:
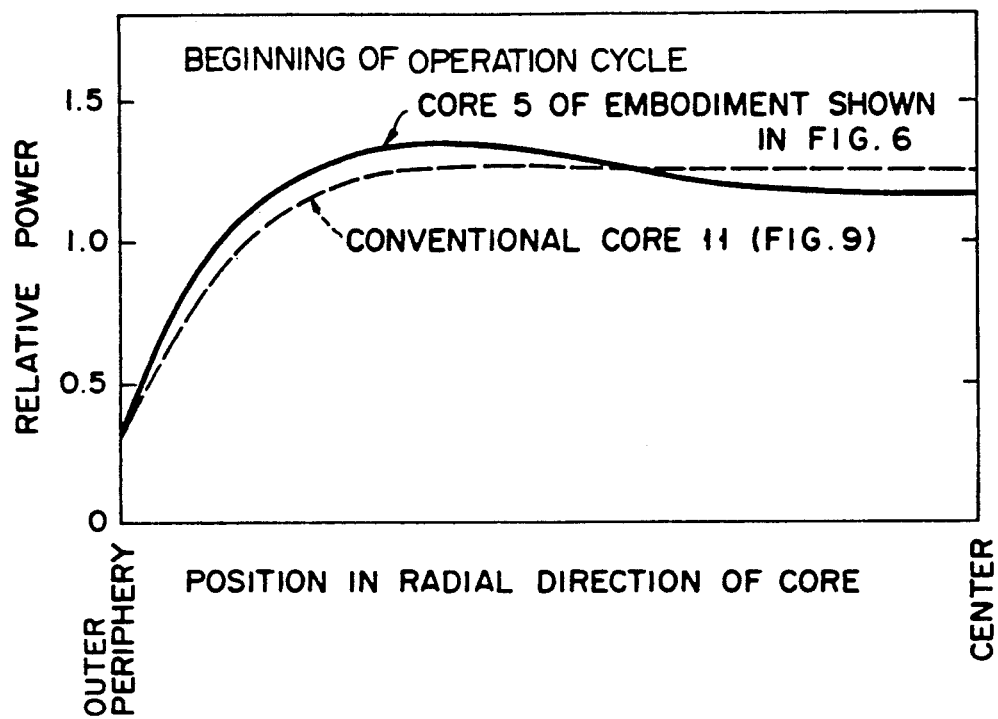
FIGS. 11A and 11B are characteristic diagrams each of which shows a relation between a position in the radial direction of a core and the relative power in the beginning and end of an operation cycle.
Figure 11B:
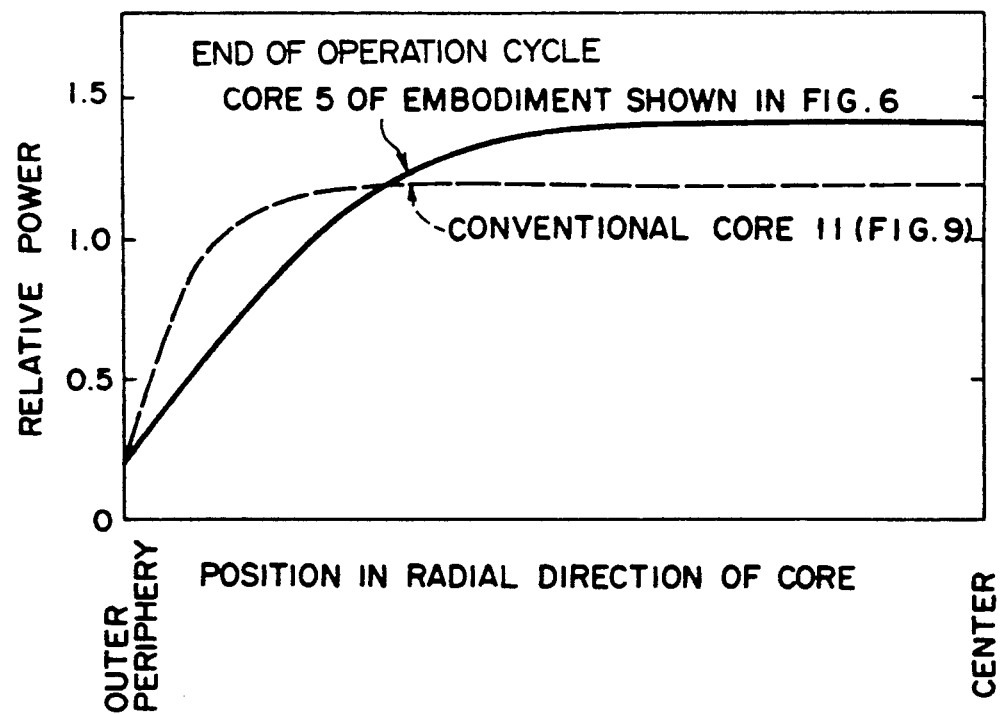

The power distributions in the radial direction of cores shown in FIG. 11A and 11B correspond to the distributions of infinite multiplication factors in the radial direction shown in FIG. 10A and 10B, respectively. The core 11 has a substantially constant power distribution in the radial direction in both the beginning and end of the operation cycle. In the core 5, during the beginning of the operation cycle, the power of the central region is lower than that of the peripheral region, and during the end of the operation cycle the power of the central region is higher than that of the peripheral region. Therefore, in the beginning of the operation cycle, the neutron leakage amount of the core 5 is greater than that of the core 11 by 0.25% $\Delta K$, and in the end of the operation cycle, the neutron leakage amount of the core 5 is smaller than that of the core 11 by 0.35% $\Delta K$. The neutron leakage amount generated over one operation cycle of the core 5 is smaller than that of the core 11. This improves the utilization factor of neutrons of the core 5, i.e., the efficiency of fuel utilization. In this embodiment, since the loading fraction of the fuel assemblies 1 in the central region is great, and since the average number of the operation cycles during which the fuel assemblies other than the fuel assemblies 1 operate in the central region of the core is greater than the average number of the operation cycles during which the fuel assemblies other than the fuel assemblies 1 operate in the peripheral region of the core as described above, the power distribution in the radial direction of the core becomes substantially flat in the beginning of the operation cycle, as shown in FIG. 11A. The power of the central region can be suppressed by making the above mentioned average number of operation cycles of the central region greater than that of the peripheral region.

Figure 12:
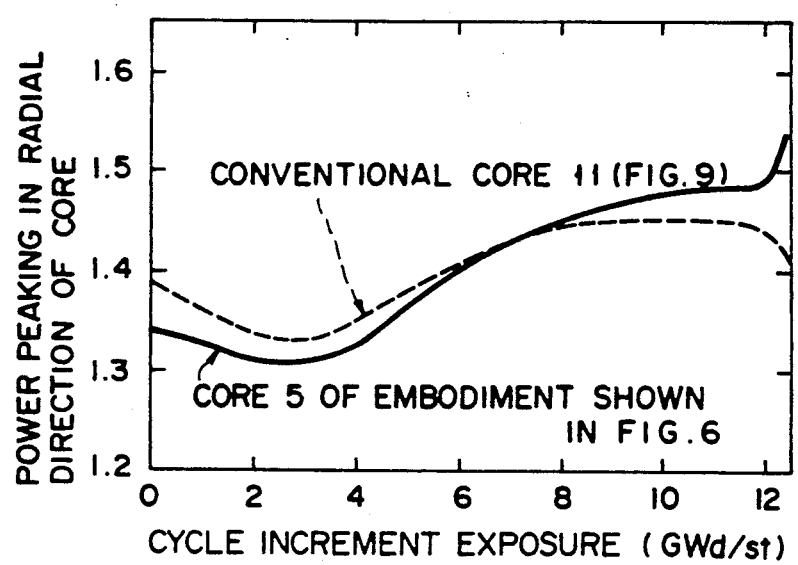
FIG. 12 is a characteristic diagram which shows a relation between the power peaking in the radial direction of a core and the exposure.
Figure 15:
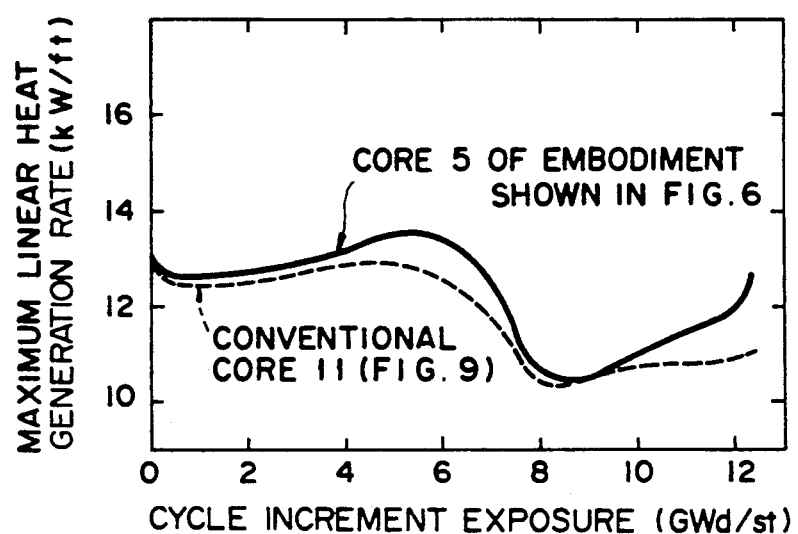
FIG. 15 is a characteristic diagram which shows a relation between the maximum linear heat generation rate and the exposure.

FIG. 12 shows a relation between the power peaking in the radial direction of cores and the exposure in an operation cycle. The power peaking in the radial direction of the core 5 is smaller than that of the core 11 in the beginning of the operation cycle and the power peaking in the radial direction of the core 5 is greater than that of the core 11 in the end of the operation cycle, since in the beginning of the operation cycle, a loading fraction of the fuel assemblies 1 which contain burnable poison and which have small infinite multiplication factors is large in the central region of the core. The power peaking in the radial direction of core increases simultaneously with the increase maximum linear heat generation rate, in the end of the operation cycle, as shown in FIG. 15 given below. However, the maximum linear heat generation rate obtained is within a permissible range.

Figure 13:
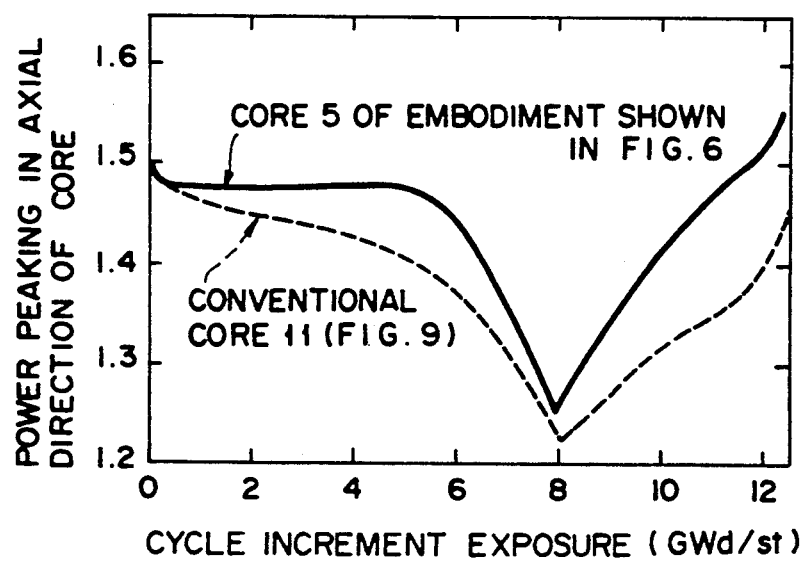
FIG. 13 is a characteristic diagram which shows a relation between the power peaking in the axial direction of a core and the exposure.

FIG. 13 shows a change in power peaking in the axial direction of each of the cores 5 and 11 in an operation cycle. In the core 11, the power fraction of the lower portion of core gradually decreases from the early state to the middle state in an operation cycle. But, in the core 5, the power fraction of the lower portion of core is maintained at a high level during the same states. The power fraction of the fuel assemblies 1 having high reactivity in the lower portion becomes higher as gadolinia burns up. In the central region having a high loading fraction of the fuel assemblies 1, therefore, the power peaking in the lower portion of core increases from the beginning of operation cycle to the middle state thereof (exposure, 8 GWd/st). Since this increase in power peaking generated in the central region compensates a monotonous decrease in power peaking of the lower portion of the core in the peripheral region, the power peaking in the lower portion of the core 5 is kept at a high value in the whole of core. On the other hand, the power peaking in the upper portion of the core 5 is greater than that of the core 11 in the end of the operation cycle. That is, since a power generated in the first half of the operation cycle by the upper portion of the core 5 is smaller than that of the core 11 according to the amount of gadolinia of the upper portion of the core which is greater than that of the lower portion thereof, the fissile materials in the upper portion of the core significantly slowly burn, so that in a power distribution a peak is present in the upper portion of the core. In particular, since the peripheral region of the core 5 includes many fuel assemblies 2 and 3 in which gadolinia is burnt out, the core 5 has an axial power distribution on which an extremely large peak is produced in the upper portion of the core. As described above, in the core 5, a change in axial power distribution is increased and an effect of spectral shift is increased as compared with U.S. Pat. No. 4,587,090. In one operation cycle, the part of operation cycle before an exposure of 8 GWd/st is called the first half, and the part after this exposure is called the latter half.

Figure 14A:
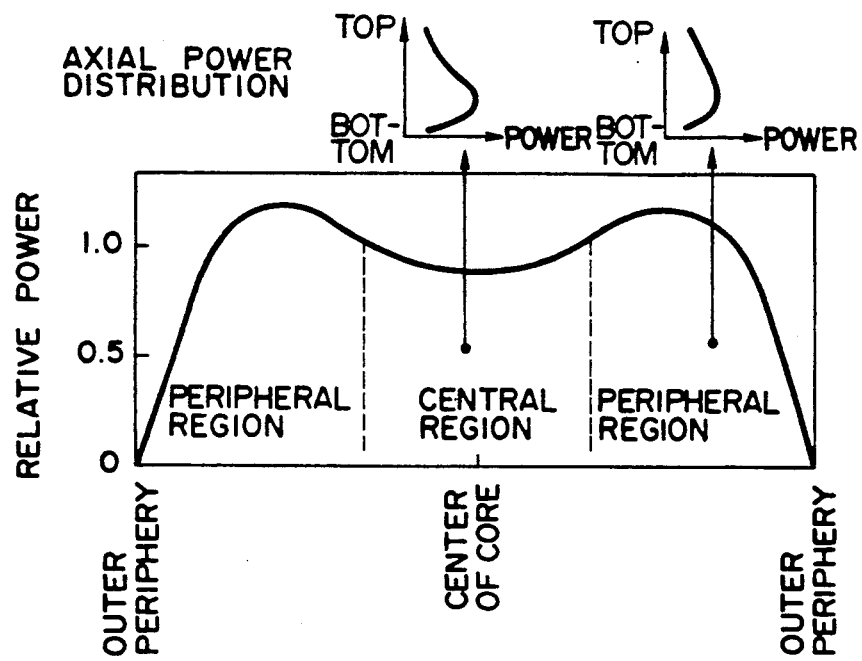
FIGS. 14A and 14B are shematic views which show the spectral shift in the core shown in FIG. 6.
Figure 14B:
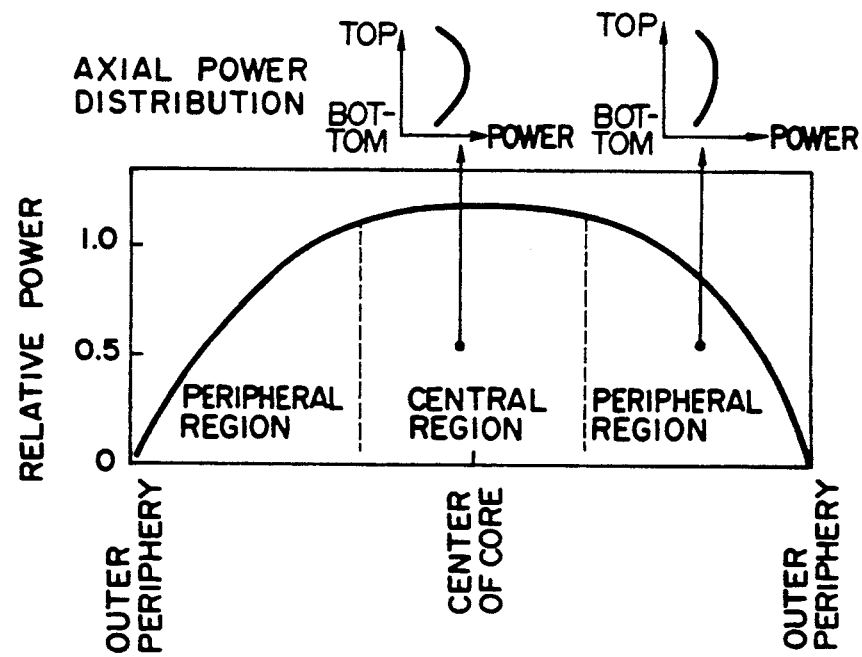

In the core 5 the effect of spectral shift is improved by the changes in reactivity distribution in the radial and axial directions. FIGS. 14A and 14B show a state of the spectral shift. FIG. 14A shows the state in the beginning of the operation cycle, and FIG. 14B shows the state in the end of the operation cycle. In both the central and peripheral regions of the core 5, the peak is shifted from the lower portion of core to the upper portion thereof as the operation cycle proceeds from the beginning to the end. The power peak of the central region of the core 5, however, is greater than that of the peripheral region thereof in both the beginning and end of the operation cycle. This phenomenon causes an increase in effect of spectral shift so that the reactivity of the core 5 is greater by about 0.8% $\Delta k$ than that of the core 11 at the end of operation cycle.

FIG. 15 shows relations between the maximum linear heat generation rates of the cores 5 and 11 and the exposure. Since the core 11 is charged with the fuel assemblies 1, the spectral shift operation shown in U.S. Pat. No. 4,587,090 is possible. The power peak in the lower portion is large because a large amount of gadolinia is contained by the upper portion of each of the fuel assemblies 1. The maximum linear heat generation rate in the core 11 therefore is great in the first half of the operation cycle. The maximum linear heat generation rate in the core 11 of the latter half of the operation cycle is smaller than that of the first half thereof because the gadolinia included by the upper portion of each fuel assembly 1 burns and decreases so that the power peak is shifted to the upper portion of the fuel assemblies 1 containing many voids. In other words, the margin for the limit value of maximum linear heat generation rate of the core 11 is increased in the latter half of the operation cycle. The core 5 of this embodiment employs the margin for the maximum linear heat generation rate of the core 11 increased in the latter half of the operation cycle. This margin is utilized for increasing the power peaking in the radial direction and axial direction of the core, i.e., for increasing the maximum linear heat generation rate of the core 5, in the end of operation cycle so that an increase in reactivity of the core 5 is significantly improved. Although the maximum linear heat generation rate of the core 5 is large in the middle stage of the operation cycle, there is still a margin for the limit value. The maximum linear heat generation rate of the core 5 in the middle stage can be reduced by adjusting the amount of gadolinia contained by the fuel assemblies 1.

The above-mentioned characteristics of the core 5 are obtained when the core 5 is operated by the same operation of control rods as the operation of control rods of the core 11. The excess reactivity of the core 5 is smaller in the first half of the operation cycle than that of the core 11. This decrease in excess reactivity enables a reduction in amount of gadolinia or in number of control rods required for controlling the excess reactivity. The reduction in amount of gadolinia causes a prevention of useless absorption of neutrons so that the reactivity is increased. The reduction in number of control rods used for controlling the excess reactivity causes a decrease in number of control rods mounted in the core during the operation of reactor, so that the working life of control rods is increased and the number of burn-out control rods is decreased. The decrease in excess reactivity in the core 5 can be achieved according to two reasons described below. The first reason is that the amount of neutrons leaking from the peripheral region of the core 5 to the outside thereof is large in the beginning of the operation cycle. The second reason is that, in the beginning of the operation cycle, the power peak in the lower portion of the core 5 is high, and the void fraction is also high.

The core 5 receives the control cells 10 in the central region. The average infinite multiplication factor of the control cells 10 is smaller than that of the other cells. The control cells 10 thus flatten the radial power distribution of the core 5 over the whole period of operation cycle. In particular, since one of the 9 control cells 10 is disposed at the center of the core and the other control cells form a circular path surrounding the one central control cell, the radial power distribution of the core 5 is constantly flattened. In addition, the amount of gadolinia included by the fuel assemblies 1 can be reduced by disposing the control cells 10 in the central region of the core 5. As a result, the amount of neutrons absorbed by the gadolinia in the central region of the core 5 is reduced, and the amount of neutrons utilized for the production of plutonium is increased, so that the spectral shift effect caused by the change in reactivity in the radial direction of core is increased.

After the reactor has been started, the power distribution is controlled by operating the control rods 7A inserted into the control cells 10. At this time, the control rods 7B are withdrawn from the core 5. The control rods 7A also compensate the decrease in reactor power caused by the burn-up of fissile materials. Such operation of control rods enables the simplification of control of the reactor power and facilitates the control from the state shown in FIG. 4A to the state shown in FIG. 4B, i.e., the control for increasing the power peak in the central region in the end of operation cycle.

Since the core 5 is charged with the fuel assemblies each having the two large-diameter water rods 9 shown in FIG. 7, the effect disclosed in lines 4 to 14 of the lower right column on page 3 of Japanese Patent Laid-Open No. 62-217186 can be obtained.

A work for exchanging the fuel in the core 5 will be described below. When the operation of reactor reaches the end point of one operation cycle, all the control rods 7 are inserted into the core 5 so as to shutdown the reactor. The work for exchanging the fuel is then performed, as described below.

The fuel assemblies 4 in the outermost peripheral region, the fuel assemblies 3 in the central region and the fuel assemblies 3 in the peripheral region other than the fuel assemblies 3 mounted in the outermost region are withdrawn as burn-out fuel assemblies from the core 5. In FIG. 6, during the exchange of fuel, the fuel assemblies 2 are moved to the positions of the fuel assemblies 3, and the fuel assemblies 1 are moved to the positions of the fuel assemblies 2. In principle, the fuel assemblies 1 and 2 disposed in the central region are loaded in the peripheral region, and the fuel assemblies 1 and 2 disposed in the peripheral region are loaded in the central region. Part of the fuel assemblies 2 disposed in the peripheral region are loaded in the outermost peripheral region. New fuel assemblies 1 containing gadolinia are loaded at the positions where the fuel assemblies 1 were loaded in the previous operation cycle. The number of the new fuel assemblies 1 loaded in the central region is greater than that of the new fuel assemblies 1 loaded in the peripheral region. Such fuel exchange enables the core 5 shown in FIG. 6 to be formed again before the next operation cycle is started. Thus, the above-described function can also be obtained in the next operation cycle.

If most of the cells in the peripheral region of the core 5 are replaced by cells each having one fuel assembly 1, two fuel assemblies 2 and one fuel assembly 3, the effect obtained in the core 5 can be attained. In this core, however, a change in reactivity distribution generated in accordance with the passage of time in one operation cycle is smaller as compared with the change in reactivity distribution generated in the core 5 in which the fuel assemblies 1 are concentrated on the side of peripheral region near the central region, so that the spectral shift effect is decreased slightly.

Figure 16:
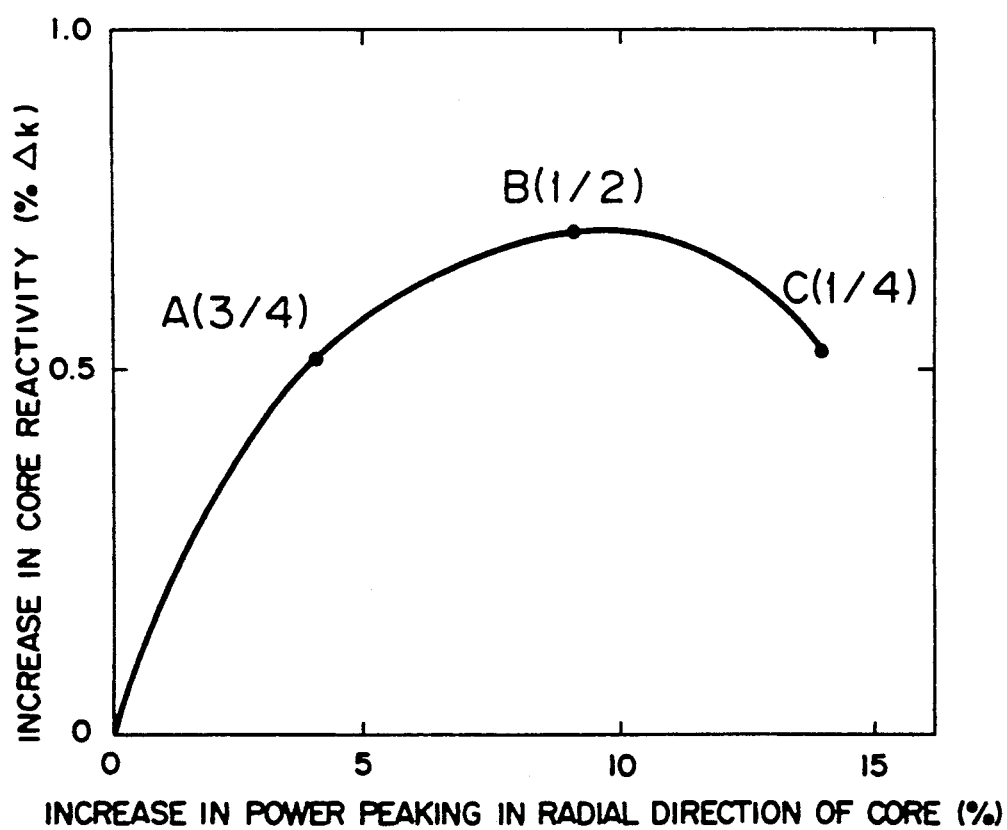
FIG. 16 is a characteristic diagram which shows a relation between the increase in power peaking in the radial direction of a core and the increase in the core reactivity, at the boundary between the central region and peripheral region of the core.

The position of boundary between the central region and the peripheral region will be described below. FIG. 16 shows a relation between an increase in reactivity of core and the position of boundary between the central region and the peripheral region. In FIG. 16, a point A denotes an increase in power peaking in the radial direction and an increase in reactivity of the core obtained when a distance between the boundary and the center of the core is ⅜ of the radius of core. Points B and C denote the characteristics obtained when the distances between the boundary formed between the central and peripheral regions and the center of the core are ½ and ¼ of the radius of the core, respectively.

The smaller the central portion is, the smaller the increase in power peaking caused by the increase in reactivity of the core is. If the area of central portion decreases to a certain degree, the reactivity of the core decreases as the power peaking increses. It is therefore preferable that the distance between the boundary formed between the central and peripheral regions and the center of the core is more than 2/5 of the radius of the core.

The above-mentioned core 5 is an equilibrium core which have operated during several operation cycles. The concept of the core 5 can be applied to an initial core. All the fuel assemblies mounted in such an initial core are new fuel assemblies. However, fuel assemblies corresponding to the fuel assemblies 1 shown in FIG. 6 contain a highest average enrichment of gadolinia. Fuel assemblies corresponding to the fuel assemblies 2, 3 and 4 shown in FIG. 6 contain no gadolinia and the greater the reference numeral of fuel assemblies is, the smaller the average enrichment is. Such an initial core can attain the same effect as the core 5.

Figure 17:
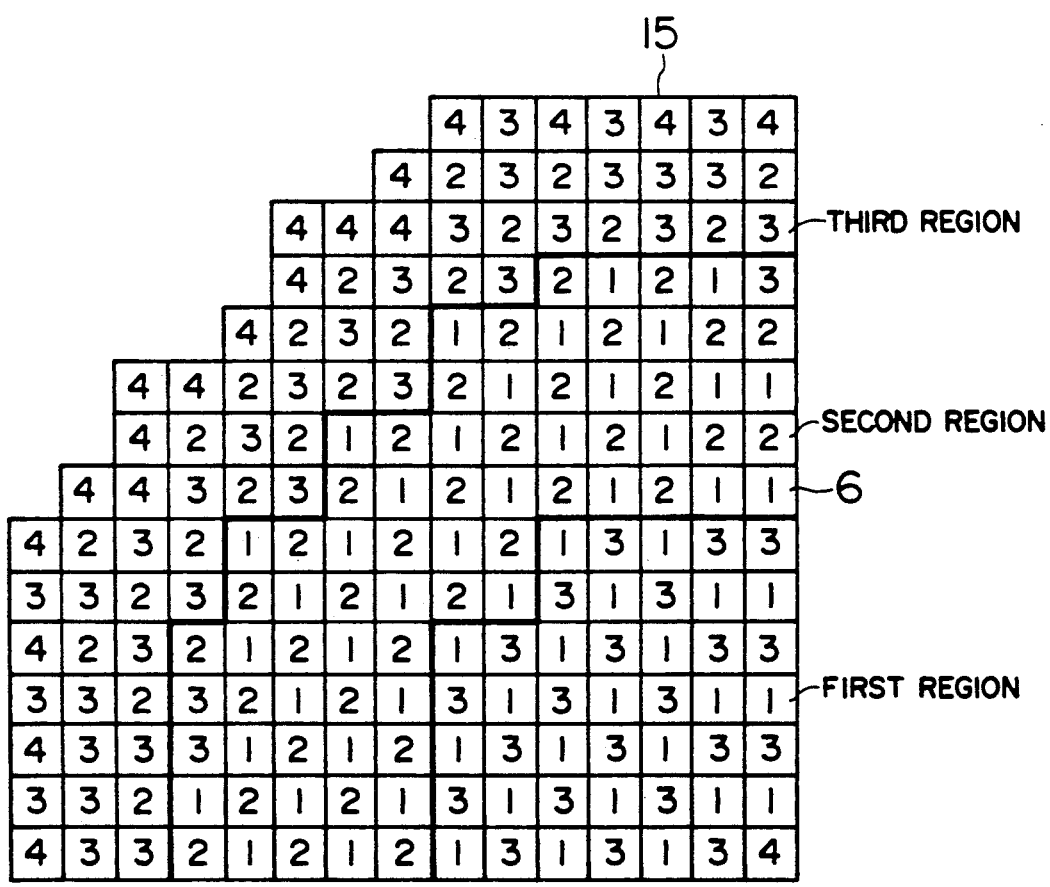
FIGS. 17 and 18 are ¼ cross-sectional views showing respectively the other embodiments of boiling water type reactors according to the present invention.

FIG. 17 shows another embodiment of a reactor core according to the present invention. The core 15 of this embodiment is divided into three regions con centrically in relation to the center of the core, that is, a first region, a second region and a third region, and a ratio by volume of these regions is 9:14:15. This configuration of the core is characterized in that new fuel assemblies 1 containing gadolinia are loaded in the first region and the second region in a ratio of 2:1. This configuration is further characterized in that the first region is charged with pairs of the new fuel assemblies and fuel assemblies 3, and the second region is charged with pairs of the new fuel assemblies 1 and fuel assemblies 2. With respect to the average number of cycles during which the fuel assemblies operate in each of the regions in the core, the average number of the second region is the smallest, that of the first region is greater than that of second region and that of the third region is greater than that of the first region. In such core 15, in the beginning of the operation cycle, the order of the average infinite multiplication factors of the three regions is $k_\infty$(first region)<$k_\infty$(second region)<$k_\infty$(third region). Thus, the power in the central portion of the core is kept at a lower level so that the excess reactivity in the beginning of the operation cycle can be effectively controlled and the exposure of the new fuel assemblies 1 is decreased.

On the other hand, in the end of the operation cycle, since the gadolinia in the new fuel assemblies 1 burns out so that the infinite multiplication factors are increased, the order of the average infinite multiplication factors of the three regions is $k_\infty$(third region)<$k_\infty$(first region)<$k_\infty$(second region). This distribution of infinite multiplication factor effectively keeps the power peaking at a low level in the radial direction of the core and increases the reactivity of the core. The core 15 of this embodiment has a characteristic of that the power peaking in the radial direction of the core 15 is smaller than that of the core 5 by about 5% of that of the core 5. The core 15 attains the same spectral shift effect as the core 5.

Figure 18:
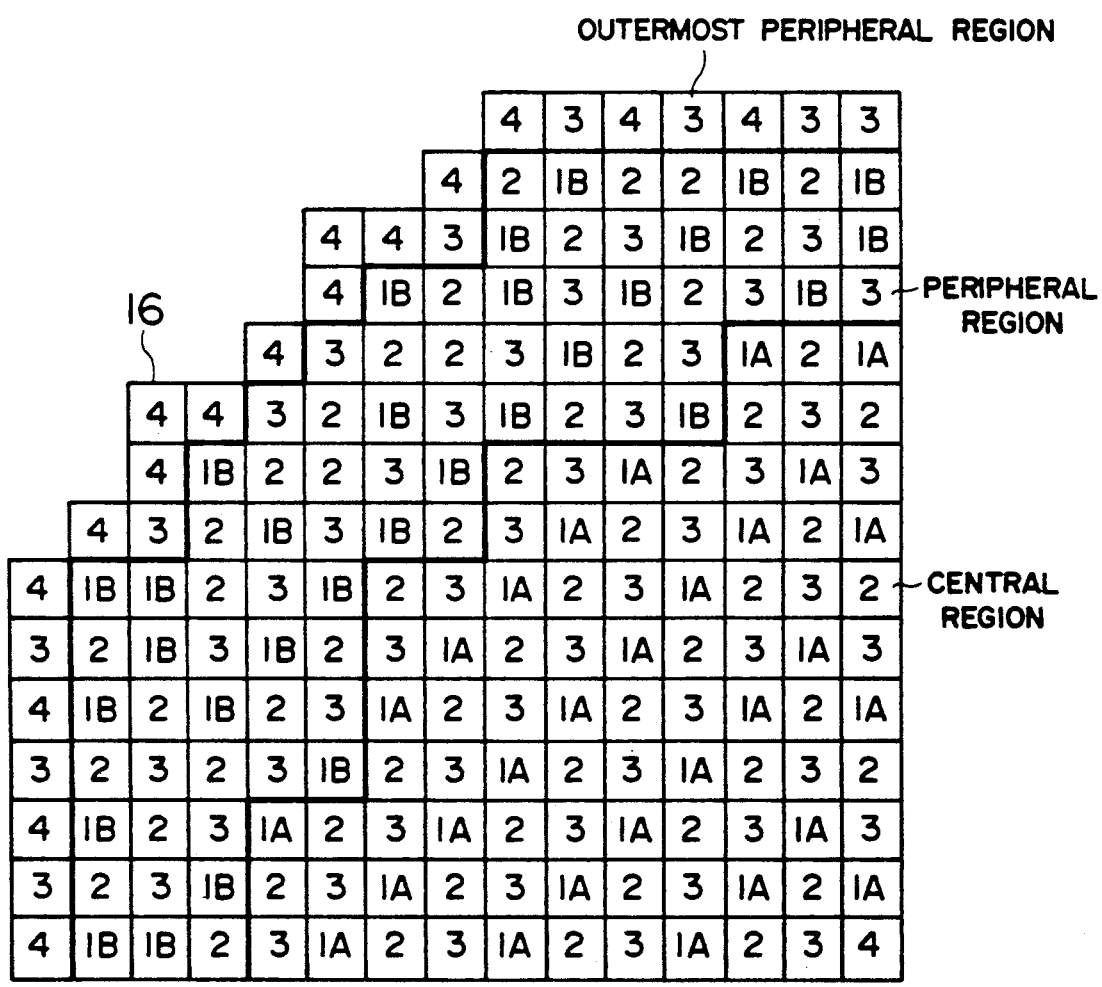
Figure 19:
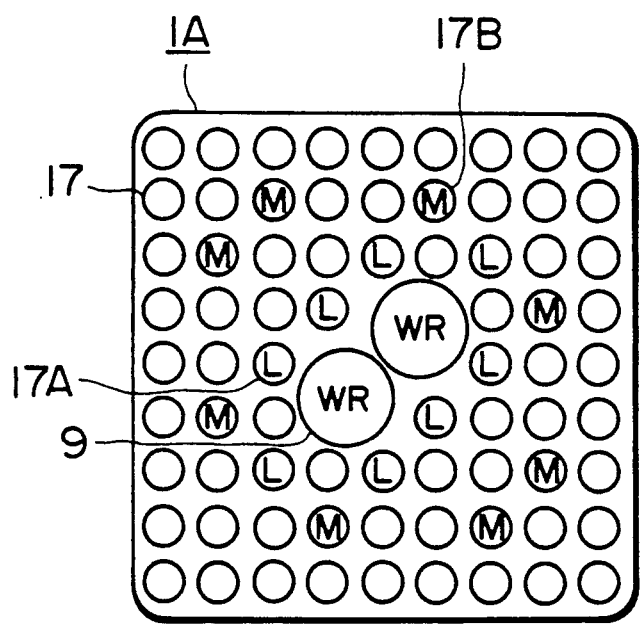
FIGS. 19 and 20 are cross-sectional views showing the fuel assemblies 1A and 1B, respectively, shown in FIG. 18.
Figure 20:
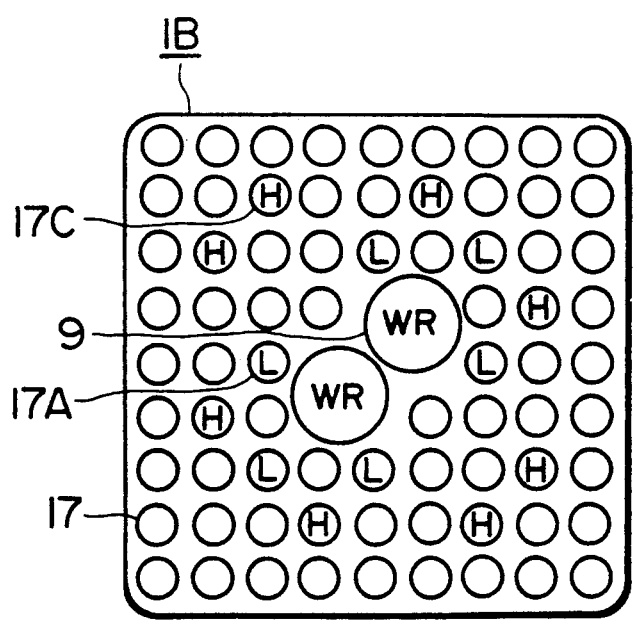

FIG. 18 shows a core 16 of a boiling water reactor as another embodiment of the present invention. In the core 16 of this embodiment, cells having fuel assemblies 1A, 2 and 3 are disposed in the central region, and cells having fuel assemblies 1B, 2 and 3 are disposed in the peripheral region. The cells in the central region include three types of cells, that is, cells each having two fuel assemblies 1A, cells each having two fuel assemblies 2 and cells each having two fuel assemblies 3. The fuel assemblies 1A and 1B are new assemblies each containing gadolinia and have the structures shown in FIGS. 19 and 20, respectively. Each of the fuel assemblies 1A and 1B has two large diameter water rods 9 at the center thereof and has fuel rods 17 which form a lattice having 9 lines and 9 columns as shown in the fuel assemblies 1. Now fuel rods 17A and 17B included by the fuel rods 17 used in the fuel assemblies 1A contain gadolinia. The gadolinia concentration of each fuel rod 17A is 3.5% by weight, and the gadolinia concentration of each fuel rod 17B is 4.5% by weight. The fuel rods 17 used in fuel assemblies 1B include fuel rods 17A and 17C containing gadolinia. The gadolinia concentration of each fuel rod 17C is 5.0% by weight. Each fuel assembly 1A contains 16 fuel rods containing gadolinia, and each fuel assembly 1B contains 14 fuel rods containing gadolinia. The amount of gadolinia contained by the fuel assemblies 1A is greater than the amount of gadolinia contained by the fuel assemblies 1B. However, the highest gadolinia concentration of the fuel assemblies 1A is smaller than that of the fuel assemblies 1B. The gadolinia concentration of each of the fuel rods 17A, 17B and 17C is constant in the axial direction of the fuel effective length. The enrichment of each of the fuel rods 17A, 17B and 17C is also constant in the axial direction of the fuel effective length. The average enrichment of the fuel assemblies 1A and 1B is about 4.0% by weight. The average gadolinia concentration of the fuel assemblies 1A is 4.0% by weight, the average gadolinia concentration of the fuel assemblies 1B is 4.7% by weight.

In the core 16 containing the fuel assemblies 1A and 1B, the average infinite multiplication factor of the peripheral region in greater than that of the central region in the beginning of the operation cycle, and the infinite multiplication factor of the central region is greater than that of the peripheral region in the end of the operation cycle, as in the core 5.

Figure 21:
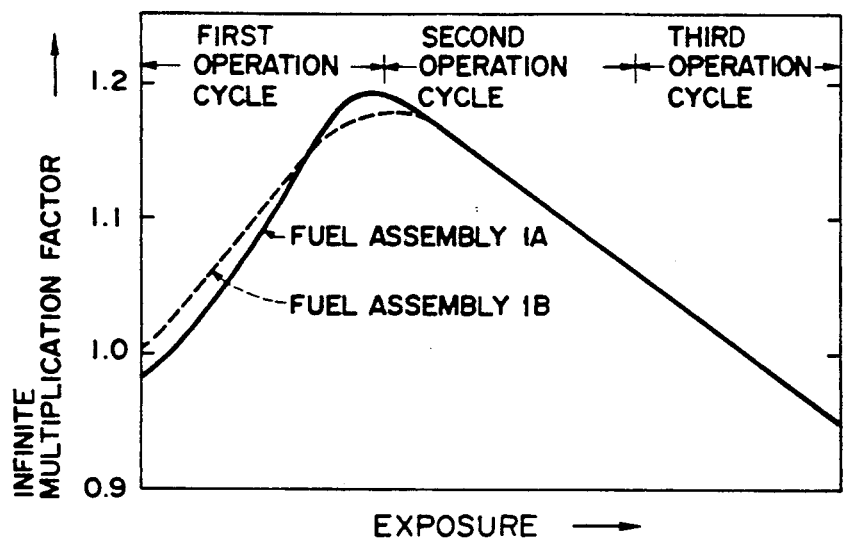
FIG. 21 is a characteristic diagram which shows a relation between the infinite multiplicataion factor and the exposure, in each of the fuel assemblies shown in FIGS. 19 and 20.

FIG. 21 shows a relation between the infinite multiplication factors and the exposure of the fuel assemblies 1A and 1B. The infinite multiplication factor of the fuel assembly 1 is smaller than that of the fuel assembly 1B in the beginning of a first operation cycle. However, the infinite multiplication factor of the fuel assembly 1A is greater than that of the fuel assembly 1B in the end of the first operation cycle at which the gadolinia burns out. The number of fuel rods containing gadolinia of each fuel assembly 1A is greater than that of each fuel assembly 1B. Since the highest gadolinia concentration (4.5% by weight) of the fuel assemblies 1A is smaller than that (5.0% by weight) of the fuel assemblies 1B, the gadolinia of the fuel assemblies 1A burns up earlier than that of the fuel assemblies 1B. In the beginning of the operation cycle, therefore, the infinite multiplication factor of the central region of the core 16 in which the fuel assemblies 1A are loaded is smaller than that of the peripheral region of the core 16. In the end of the operation cycle, contrary, the infinite multiplication factor of the central region of the core 16 is greater than that of the peripheral region of the core 16.

The core 16 has the maximum linear heat generation rate within a permissible range and allows the reactivity distribution in the radial direction of core to be changed between the beginning and the end of the operation cycle, as the core 5. In the core 16, therefore, the spectral shift effect can be caused by the change in reactivity distribution in the radial direction of the core, as in the core 5.

The core 16 may have the 9 control cells 10 in the central region, as the core 5. This causes the core 16 to obtain the same effect as the effect obtained by the control cells 10 arranged in the core 5. When the concepts of the enrichment distribution and the gadolinia concentration distribution in the axial direction shown in FIGS. 8A and 8B are applied to the fuel assemblies 1A and 1B in the core 16, the spectral shift effect is caused by the change in reactivity distribution in the axial direction as in the core 5. The core 16 can be applied to both an equilibrium core and an initial core.

Figure 22:
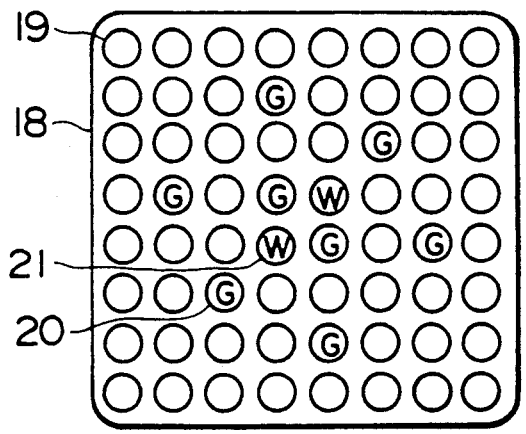
FIG. 22 is a cross-sectional view showing one of the fuel assemblies which form a further embodiment of a reactor core according to the present invention.
Figures 23A, 23B:
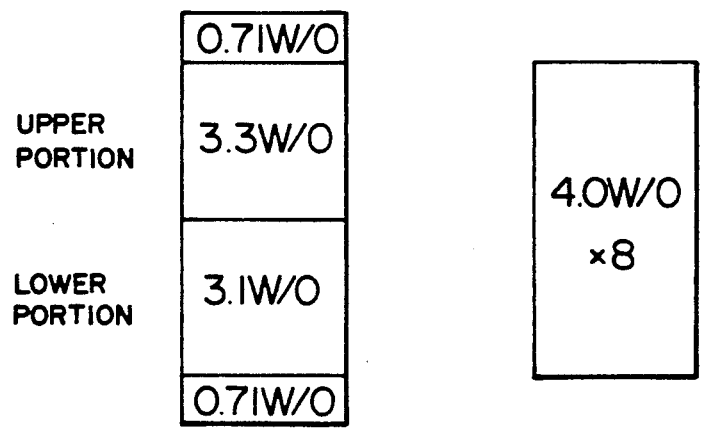
FIG. 23A and B is an explanatory view which shows the enrichment and gadolinia distribution in each of the fuel rods used in the fuel assembly shown in FIG. 22.

A core of boiling water reator according to the present invention will be described below. The core of this embodiment employs the fuel assembly 18 shown in FIG. 22 in place of the fuel assembly 1 of the core 5 shown in FIG. 5. A gadolinia distribution of the fuel assembly 18 is different from that of the fuel assembly 1 whose gadolinia distribution changes positively the axial power distribution. The fuel assembly 18 has two water rods each having the same outer diameter as each fuel rod 19 in the central region and has the fuel rods 19 form a lattice having 8 lines and 8 columns, as shown in FIG. 22. In each of the fuel rods 19, the upper end and lower end portions of the fuel effective length are charged with natural effective uranium, and the enrichment of the lower enriched uranium region is 3.1% by weight and the enrichment of the upper enriched uranium region is 3.3% by weight, as shown in FIG. 23A. Each of fuel rods 20 containing gadolinia contains 4.0% by weight of gadolinia, as shown in FIG. 23B.

The core of this embodiment also allows the reactivity distribution in the radial direction of the to be changed between in the beginning and end of the operation cycle in the same way as the core 5. In other words, the core of this embodiment enables an increase in reactivity in the end of the operation cycle by utilizing the margin for the maximum linear heat generation rate in the end. This embodiment enables the achievement of spectral shift effect by utilizing the change in reactivity distribution in the radial direction of the core. However, in a core the fuel assemblies 2, 3 and 18 of which are uniformly disposed as in the core shown in FIGS. 8A and 8B, the margin for maximum linear heat generation rate of the end of the operation cycle is smaller than that of the beginning of the operation cycle. This tendency is reverse to the tendency of the core 11. Thus, the increase in reactivity in the end of the operation cycle of this embodiment is smaller than that of the core 5. The spectral shift effect of this embodiment is therefore smaller than that of the core 5.

In particular, if the power in the upper portion of the core becomes relatively large in the end of the operation cycle, the reactivity can be effectively increased by the structure of the core of this embodiment. Since voids are actively generated in a high power fuel assembly, the reactivity in the upper portion of the core is restrained. If the power in the central region of the core is increased, the axial power distribution in the central region is flattened, so that the power in the central region can be increased without the maximum linear heat generation rate being significantly increased.

The present invention can be also applied to pressure water reactors as well as boiling water reactors.

What is claimed is:

1. A boiling water reactor core having a plurality of cells each containing four fuel assemblies adjacent to a control rod, comprising a radially central region of the core and a peripheral region surrounding said central region, said fuel assemblies including first fuel assemblies containing burnable poison which substantially burns out in a first operation cycle of operation of the core and second fuel assemblies which have completed the first operation cycle to effect burn out of the burnable poison therein, a loading fraction of the first fuel assemblies in the central region being larger than a loading fraction thereof in the peripheral region, and a loading fraction of the second fuel assemblies in the peripheral region being larger than a loading fraction thereof in the central region.

2. A boiling water reactor core according to claim 1, wherein said first and second fuel assemblies are disposed in the diagonal direction in each of said cells containing them.

3. A boiling water reactor core according to claim 1, wherein said second fuel assemblies are fuel assemblies each having no burnable poison.

4. A boiling water reactor core according to claim 1, wherein each of said first fuel assemblies is divided into an upper portion and a lower portion in the axial direction thereof, the average enrichment of said upper portion is greater than that of said lower portion, the amount of burnable poison contained in said upper portion is greater than the amount of burnable poison contained in said lower portion.

5. A boiling water reactor core according to claim 1, wherein a plurality of first cells each containing said first fuel assemblies and a plurality of second cells an average infinite multiplication factor of which is smaller than that of said first cells and into each of which a control rod for controlling the power of reactor is inserted, are disposed in said central region.

6. A boiling water reactor core according to claim 5, wherein one of said second cells is disposed at the center of core, and the other second cells are disposed around said second cell disposed at said center of core in a circular form.

7. A boiling water reactor core according to claim 1, wherein a distance between a boundary between the central region and the peripheral region and a center of the core is greater than 2/5 of a radius of the core.

8. A boiling water reactor core according to claim 1, wherein each of the fuel assemblies has a plurality of fuel rods and two water rods arranged between the fuel rods, outer diameters of the water rods being larger than a pitch of the fuel rods, and the two water rods occupying a space capable of receiving seven fuel rods.

9. A boiling water reactor core according to claim 1, wherein said central region receives a plurality of first cells each of which includes two of said first fuel assemblies and two of said second fuel assemblies, a number of operation cycles where one of the two second fuel assembles was operated being different from a number of operation cycles where another of the two second fuel assemblies was operated, said peripheral region receives a plurality of second cells each of which includes four of said a second fuel assemblies, two of said four second fuel assemblies operating in a second operation cycle after the first operation cycle, numbers of operation cycles where the other two of said four second fuel assemblies were operated being different from a number of operation cycles where said two of said four second fuel assemblies were operated.

10. A boiling water reactor core according to claim 9, wherein a plurality of first cells each containing said first fuel assemblies and a plurality of second cells an average infinite multiplication factor of which is smaller than that of said first cells and into each of which a control rod for controlling the power of reactor is inserted, are disposed in said central region.

11. A method of charging a reactor with fuel when fuel assemblies mounted in a core are exchanged after said reactor has been shut down, comprising the steps of, withdrawing burnt-out fuel assemblies having no life, rearranging fuel assemblies remaining in said core to make a loading fraction of second fuel assemblies which have completed a first operation cycles of operation of said core to effect burn out of burnable poison therein for operation in at least a second operation cycle in a radially central region of said core to be smaller than a loading fraction of the second fuel assemblies operating in at least the second operation cycle in a peripheral region of said core surrounding said central region, and loading new first fuel assemblies containing burnable poison in said core to make a loading fraction of said new first fuel assemblies mounted in said central region to be greater than a loading fraction of said new first fuel assemblies loaded in said peripheral region, wherein the burnable poison contained by the new first fuel assemblies substantially burns out in the first operation cycle.

12. A method according to claim 11, wherein the reactor is a boiling water reactor.

* * * * *